(12) United States Patent
Brennan et al.

(10) Patent No.: US 10,138,413 B2
(45) Date of Patent: Nov. 27, 2018

(54) PROMOTERS FOR PEROXIDES IN AQUEOUS TREATMENT FLUIDS

(71) Applicant: Arkema Inc., King of Prussia, PA (US)

(72) Inventors: Joseph M. Brennan, Swarthmore, PA (US); Jason M. Lyons, King of Prussia, PA (US); Leonard H. Palys, Downington, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 14/770,104

(22) PCT Filed: Feb. 20, 2014

(86) PCT No.: PCT/US2014/017276
§ 371 (c)(1),
(2) Date: Aug. 25, 2015

(87) PCT Pub. No.: WO2014/133853
PCT Pub. Date: Sep. 4, 2014

(65) Prior Publication Data
US 2016/0009985 A1    Jan. 14, 2016

Related U.S. Application Data

(60) Provisional application No. 61/769,830, filed on Feb. 27, 2013.

(51) Int. Cl.
C09K 8/68    (2006.01)
C09K 8/88    (2006.01)
C09K 8/90    (2006.01)

(52) U.S. Cl.
CPC .............. *C09K 8/685* (2013.01); *C09K 8/885* (2013.01); *C09K 8/887* (2013.01); *C09K 8/90* (2013.01); *C09K 2208/26* (2013.01)

(58) Field of Classification Search
None
See application file for complete search history.

(56) References Cited

U.S. PATENT DOCUMENTS

| 8,293,687 B2 | 10/2012 | Giffin |
| 8,481,462 B2 | 7/2013 | Lin et al. |
| 2005/0261138 A1* | 11/2005 | Robb ........................ C09K 8/68 507/209 |
| 2007/0042913 A1* | 2/2007 | Hutchins ................. C09K 8/68 507/269 |

(Continued)

FOREIGN PATENT DOCUMENTS

| WO | WO 2009/111324 A1 | 9/2009 |
| WO | WO 2011/034807 A2 | 3/2011 |
| WO | WO 2013/116875 A1 | 8/2013 |

*Primary Examiner* — Jeffrey D Washville
(74) *Attorney, Agent, or Firm* — Lynn B. Morreale

(57) ABSTRACT

The addition of at least one promoter selected from the group consisting of thiosulfate salts, sulfite salts, bisulfite salts, erythorbate salts, isoascorbate salts, and combinations thereof to an aqueous treatment fluid containing a viscosifying polymer and a peroxide helps to promote the activity of the peroxide as a breaker, thus facilitating a reduction in viscosity of the aqueous treatment fluid at lower temperatures than are possible in the absence of the promoter. The promoted aqueous treatment fluid is useful as a fracture fluid to fracture subterranean formations in oil and gas recovery.

19 Claims, 5 Drawing Sheets

Example 1

(56) References Cited

U.S. PATENT DOCUMENTS

| | | |
|---|---|---|
| 2007/0114022 A1 | 5/2007 | Nguyen |
| 2009/0082228 A1 | 3/2009 | Parris et al. |
| 2009/0221453 A1 | 9/2009 | Mukhopadhyay et al. |
| 2011/0005969 A1* | 1/2011 | Giffin .................. C09K 8/685 208/14 |
| 2011/0247821 A1 | 10/2011 | Thompson et al. |
| 2011/0256085 A1* | 10/2011 | Talingting Pabalan ..................... A61K 8/042 424/70.13 |
| 2012/0012320 A1 | 1/2012 | Weaver et al. |
| 2012/0241158 A1 | 9/2012 | Seshadri et al. |
| 2013/0228334 A1 | 9/2013 | Jiang et al. |

\* cited by examiner

Example 1

Example 2

Example 3

Example 4

Example 5

PROMOTERS FOR PEROXIDES IN AQUEOUS TREATMENT FLUIDS

CROSS-REFERENCE TO RELATED APPLICATIONS

This application is a national stage application under 35 U.S.C. § 371 of PCT/US2014/017276, filed Feb. 20, 2014, which claims benefit to U.S. patent application Ser. No. 61/769,830, filed on Feb. 27, 2013.

FIELD OF THE INVENTION

The invention relates to aqueous treatment fluid compositions (also referred to as "aqueous treatment fluids") and methods of using the aqueous treatment fluid compositions to fracture subterranean formations in oil and gas recovery.

BACKGROUND

Hydraulic fracturing and fracture-acidizing are techniques commonly utilized to stimulate the production of oil and gas from subterranean formations of low permeability. In such treatments, fracturing fluids are introduced into the subterranean formation under sufficient pressure and having sufficient viscosity to create cracks or fractures in the formation and to also propagate these fractures out into the formation. The aqueous treatment fluids may contain entrained proppants, such as sand or sintered bauxite, so that as the aqueous treatment fluid seeps into the formation or is backflowed out from the fractures, the fractures close upon the proppants to maintain the fractures in an open state for increased permeability.

In using certain aqueous treatment fluids, such as high viscosity aqueous gels, the high viscosity of these fracturing fluids should be maintained while the fractures are being created and propagated, as well as to aid in transporting the proppants to the farthest reaches of the fractures. After the proppants have been trapped in the fractures, however, it is desirable that the viscosity of the aqueous treatment fluid is quickly reduced to allow the fluid to flow back through the fractures, around the proppants and back into the wellbore. Chemicals utilized to reduce the viscosity of fracturing fluids are commonly called "breakers" or "breaker fluids" and are introduced into the fractures to act upon the fracturing fluids. The breakers, however, may be difficult to control. For example, the breakers may not begin to reduce the viscosity of the aqueous treatment fluid for a prolonged period of time after the proppants are deposited. Thus, the breakers may fail to break down the aqueous treatment fluids rapidly enough at relatively low temperatures sufficient to meet needs. Control over the timing of viscosity reduction is highly desirable in subterranean treatment operations such as fluid fracturing.

SUMMARY OF THE INVENTION

The present invention provides useful aqueous treatment fluids whereby the temperature at which a break in fluid viscosity caused by peroxides takes place is unexpectedly and advantageously lowered through the introduction of a salt composition such as, for example, thiosulfate salt, sulfite salt, bisulfite salt, erythorbate salt, isoascorbate salt, and combinations thereof. In one embodiment of the invention, the salt acts as a promoter for the peroxide breaker. Incorporation of the salt in the aqueous treatment fluid expands the useful operating temperature range of peroxides as breakers. Thus, the viscosity of the aqueous treatment fluid may be maintained at a relatively high level for a certain period of time so as to carry out the desired amount of fracturing in a subterranean formation. In one aspect of the invention, once the desired amount of fracturing is attained, the peroxide breaker then degrades the polymer in the aqueous treatment fluid in a controlled manner. Certain embodiments of the invention include aqueous treatment fluid compositions and methods of using the aqueous treatment fluid compositions.

In one aspect, the invention provides an aqueous treatment fluid comprising, consisting essentially of, or consisting of water, at least one viscosifying polymer, at least one peroxide, and at least one promoter selected from the group consisting of thiosulfate salts, sulfite salts, bisulfite salts, erythorbate salts, isoascorbate salt, and combinations thereof, wherein the aqueous treatment fluid is essentially free of amine when the promoter is a thiosulfate salt.

In another aspect, the invention provides a method comprising introducing an aqueous treatment fluid into at least a portion of a subterranean formation, wherein the aqueous treatment fluid comprises at least one viscosifying polymer, at least one peroxide, and an amount of at least one promoter selected from the group consisting of thiosulfate salts, sulfite salts, bisulfite salts, erythorbate salts, isoascorbate salts, and combinations thereof, which is effective to decrease the break temperature of the aqueous treatment fluid, the aqueous treatment fluid being essentially free of amine when the promoter is a thiosulfate salt.

Another aspect of the invention provides a method for promoting the breaking of an aqueous treatment fluid comprising at least one viscosifying polymer and at least one peroxide, wherein the method comprises the step of introducing at least one promoter selected from the group consisting of thiosulfate salts, sulfite salts, bisulfite salts and combinations thereof into the aqueous treatment fluid.

DESCRIPTION OF THE DRAWINGS

FIG. 1 and Example 1 demonstrate that the compositions and processes of this invention result in an efficient break of guar fluid viscosity at lower temperatures not achieved using t-butylhydroperoxide (tBHP) alone.

FIG. 2 and Example 2 demonstrate that the use of the sodium thiosulfate provides an unexpected synergy that quickly and effectively breaks a guar fracture fluid using less peroxide breaker, versus the use of 5% t-butyl hydroperoxide alone.

FIG. 3 and Example 3 demonstrate that a significant break occurred in two hours using a solution comprising 5% aqueous solution of t-butylhydroperoxide and a 10% aqueous solution of sodium sulfite at a temperature of 170 degrees F.

FIG. 4 and Example 4 demonstrate that a delayed break of two hours was achieved using a solution comprising 0.5 GPT of a 10% aqueous sodium D-isoacorbate monohydrate with 1.0 GPT of 5% tert-butyl hydroperoxide and a polysaccharide delayed borate crosslinked fracture fluid, at 170 F. Using five times the amount of 5.0 GPT of 5% tert-butyl hydroperoxide aqueous solution at 170 F under the same conditions provided no significant reduction in viscosity after three hours.

DETAILED DESCRIPTION OF THE INVENTION

Figure 1:
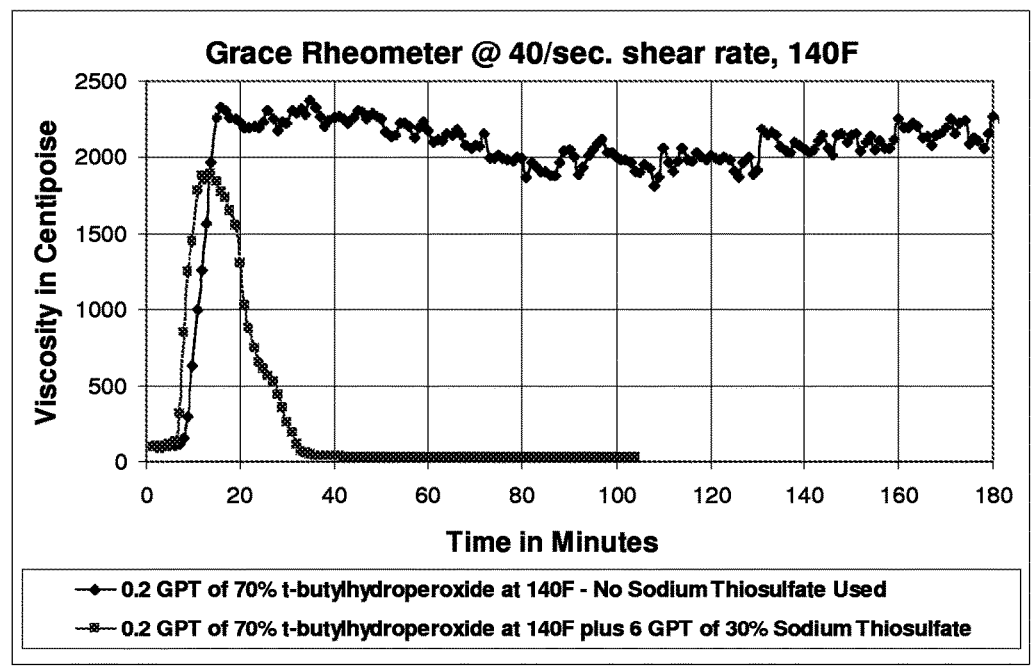
FIG. 1 pertains to Example 1.

"Aqueous treatment fluid" or "fracturing fluid" or "fracture fluid" are used herein interchangeably to mean a fluid suitable for use in fracturing, gravel packing, and/or acidizing fluids, and the like. In particular, the aqueous treatment fluid is suitable for use in hydraulic fracturing operations for enhanced oil and gas recovery, including fracking.

"Breaker," "breaking fluid," "free-radical breaker," or "free radical generator" are used herein to mean a compound that reduces the viscosity of the aqueous treatment fluid. Most broadly, breakers may work in any suitable manner, for example, by degrading the viscosifying polymers by attacking the cross-links, cleaving the polymer chain, or the like, or by other mechanisms, including mechanisms specific to a particular breaker, breaking fluid, free-radical breaker, or free radical generator.

As used herein, "viscosity" has its ordinary meaning: a measure of the internal resistance of a fluid (or a measure of fluid friction). A fluid with a higher viscosity is "thicker" than a fluid with a lower viscosity. Appropriate viscosities of the aqueous treatment fluid during fracturing and recovery of the aqueous treatment fluid are readily ascertainable by one skilled in the art.

As used herein, "degradation of the polymer" or "degradation of the aqueous treatment fluid" means breakdown or decomposition of the polymer in the aqueous treatment fluid or the aqueous treatment fluid. For example, the polymer may decompose into smaller compounds, or the crosslink density of the polymer may be reduced, or the molecular weight of the polymer may be lowered, causing the viscosity of the aqueous treatment fluid to be reduced.

As used herein, unless specified otherwise, the values of the constituents or components of the compositions are expressed in weight percent or percent by weight of each ingredient in the composition.

There is a need to stabilize the aqueous treatment fluids, especially at higher temperatures, to maintain desirable high solution viscosity during fracturing. After the fracturing is completed, however, these viscous aqueous treatment fluids need to be degraded to allow the flow of the gas or oil from the fractured rock that is propped open by the proppant. Thus, in order to control or promote the degradation of the aqueous treatment fluid at a suitable time or at suitable conditions (e.g., a temperature in the range of from about 125° F. to about 200° F.), at least one thiosulfate salt composition is combined with the aqueous treatment fluid. According to one aspect of the present invention, a method for using an aqueous treatment fluid in forming subterranean fractures comprises accelerating degradation of a polymer in an aqueous treatment fluid when the aqueous treatment fluid comprises a peroxide breaker by combining at least one promoter selected from the group consisting of thiosulfate salts, sulfite salts, bisulfite salts and combinations thereof, with the aqueous treatment fluid. In one embodiment, the aqueous treatment fluid is essentially free, or free, of other substances capable of acting as peroxide promoters; in particular, the aqueous treatment fluid may be essentially free, or free, of amine, such as the amines previously described in the art as being useful for promoting the breaking of fracture fluids containing peroxide.

The promoter enables a reduction in the temperature and/or a reduction in the time at which the polymers in the aqueous treatment fluid exhibit a reduction in viscosity sufficient to facilitate removal of the used aqueous treatment fluid from a subterranean formation. The promoter may also serve to lower the concentration of peroxide necessary to break the viscosity of an aqueous treatment fluid under a specific set of conditions. Furthermore, the promoter may increase the rate at which viscosity breaks (i.e., under a particular set of conditions, the viscosity break is sharper than that observed in the absence of the promoter). Thus, the at least one promoter such as a thiosulfate salt works in combination with the peroxide to reduce the viscosity of the polymer under various temperatures, following appropriate fracturing of the rock and/or deposition of the proppant in the fractures, such that the aqueous treatment fluid is capable of readily flowing back through the fractures, around the proppants and back into the wellbore, from which the aqueous treatment fluid can then be withdrawn and disposed of.

In the oil and gas industry, thiosulfate salts such as sodium thiosulfate have been used as oxygen scavengers at higher temperatures, e.g., 240 to 280° F. At these higher temperatures, sodium thiosulfate functions as a gel stabilizer, thereby maintaining the high viscosity of fracturing fluids which have been thickened using water soluble or water swellable polymers such as modified guar gums. Surprisingly, it has been discovered that thiosulfate salts are capable of promoting the activity of peroxides as breakers in fracturing fluids, such that the fracturing fluid exhibits a break in viscosity at a relatively low temperature in the presence of thiosulfate salt. In the absence of thiosulfate salt, no viscosity break is observed in the fracturing fluid under the same conditions (i.e., the peroxide exhibits little or no activity as a breaker under such conditions). Thus, as used in the present invention and without intending to be bound by any theory, it is believed that the thiosulfate salts may facilitate the reduction in viscosity of a thickened aqueous composition containing viscosifying polymer which is brought about through a peroxide breaker.

Suitable promoters for purposes of this invention include any salt of thiosulfate, wherein thiosulfate corresponds to ionic chemical species $S_2O_3^{2-}$. Suitable promoters also include any salt of sulfite, wherein sulfite corresponds to ionic chemical species $SO_3^{2-}$, as well as any salt of bisulfite, wherein bisulfite corresponds to ionic chemical species $HSO_3^-$. Salts of erythorbic acid are also suitable for use as promoters. Combinations of different types of such promoters may also be utilized. In one aspect of the invention, the promoter is water-soluble. The ions or cations associated with the promoter may be, for example, ammonium, alkali metals such as sodium or potassium, alkaline earth metals such as calcium, metals such as silver, iron, copper, cobalt, manganese, vanadium and the like, and combinations thereof. Illustrative examples of thiosulfate salts useful in the present invention include, but are not limited to, sodium thiosulfate, potassium thiosulfate, ammonium thiosulfate, silver thiosulfate, iron thiosulfate, copper thiosulfate, cobalt thiosulfate, calcium thiosulfate, manganese thiosulfate, vanadium thiosulfate, and combinations thereof. Sodium sulfite, sodium bisulfite and sodium erythorbate are also suitable for use as promoters in the present invention. The promoter may, for example, be incorporated into the aqueous treatment fluid as a conventional solid salt, as a polymer-encapsulated/coated (time-release) solid salt, or as a concentrated aqueous salt solution.

The concentration of promoter such as thiosulfate salt in the aqueous treatment fluid may be selected and controlled so as to achieve the desired level of promotion with respect to the peroxide. In one aspect of the invention, an amount of promoter such as thiosulfate salt is present in the aqueous treatment fluid which is effective to lower the break temperature of the aqueous treatment fluid as compared to the break temperature exhibited by the aqueous treatment fluid in the absence of such promoter. For example, the aqueous treatment fluid may contain an amount of promoter (e.g., thiosulfate salt) which is sufficient to reduce the temperature at which the aqueous treatment fluid experiences a break in viscosity by at least 5° F., by at least 10° F., by at least 15° F., by at least 20° F., by at least 30° F., by at least 50° F., by at least 75° F., by at least 100° F., or even more. The incorporation of one or more promoters in an aqueous treatment fluid in accordance with the present invention thus may effectively extend, expand, and/or increase the useful working temperature range of a peroxide breaker.

Typically, the aqueous treatment fluid will be formulated to contain, in various embodiments of the invention, from about 0.001% to about 10%, about 0.002% to about 5%, about 0.005% to about 2.5%, or about 0.01% to about 1.5% of total promoter, including promoter selected from the group consisting of thiosulfate salts, sulfite salts, bisulfite salts, erythorbate salts, isoascorbate salts, and combinations thereof.

The promoter(s) (e.g., thiosulfate salt(s)) may be combined with the other selected components of the aqueous treatment fluid at any suitable time and using any suitable techniques known in the art. For example, the at least one promoter may be added and mixed with the other aqueous treatment fluid components prior to supplying the aqueous treatment fluid to the subterranean rock formation. Alternatively, the other components of the aqueous treatment fluid can be simultaneously mixed with the at least one promoter when pumping the aqueous treatment fluid into the wells. Additionally, the at least one promoter could be added at some time subsequent to the introduction of the other components of the aqueous treatment fluid into the wellbore.

In one aspect of the invention, the aqueous treatment fluid is characterized as being essentially free, or free, of any added amine. For example, the aqueous treatment fluid may contain less than 1 weight %, less than 0.5 weight %, less than 0.1 weight %, less than 0.01 weight %, or even 0 weight % amine. In other aspects, the aqueous treatment fluid is essentially free of any accelerator, activator or promoter for peroxide other than the promoters which are the subject of the present invention. That is, the aqueous treatment fluid does not contain an amount of any substance other than thiosulfate salt, sulfite salt, bisulfite salt and/or erythorbate salt that is effective to enhance the activity of the peroxide as a viscosity breaker. In certain embodiments when the promoter is a thiosulfate salt, the aqueous treatment fluid may be essentially free, or free, of amine.

The aqueous treatment fluid comprises at least one peroxide breaker in order to break down the viscosity of the aqueous treatment fluid after the fracturing process and/or depositing the proppant in the cracks. The peroxide may include any peroxide effective for reducing the viscosity of the polymer in the aqueous treatment fluid or the aqueous treatment fluid itself. The peroxide may be hydrogen peroxide, inorganic peroxide and/or organic peroxide. In one aspect of the invention, the peroxide is room temperature stable organic peroxide (i.e., an organic peroxide which does not exhibit significant degradation or decomposition when stored at 25° C. in the absence of substances other than inert solvents). In another aspect, the peroxide is water soluble. For example, the peroxide may have a water solubility greater than 1 g/100 g water at 25° C. The peroxide may be both water soluble and stable at room temperature.

Suitable peroxides include, for example, diacyl peroxides, peroxyesters, monoperoxycarbonates, peroxyketals, hydroperoxides (including alkyl hydroperoxides and aryl hydroperoxides), peroxydicarbonates, ketone peroxides, endoperoxides, and dialkyl peroxides. Combinations of different peroxides, including combinations of different organic peroxides, may be utilized.

Suitable peroxyesters may include, without limitation: di-tert-butyl diperoxyphthalate; di-tert-amyl diperoxyphthalate; tert-butyl peroxybenzoate; tert-amyl peroxybenzoate; tert-butyl peroxyacetate; tert-amyl peroxyacetate; 2,5-di(benzoylperoxy)-2,5-dimethylhexane; tert-butyl peroxymaleate; tert-amyl peroxymaleate; tert-butyl peroxy-2-ethylhexanoate; tert-butyl peroxyisobutyrate; tert-amyl peroxyisobutyrate; di(tert-butylperoxy)fumarate; tert-butyl peroxy(2-ethylbutyrate); tert-butyl peroxy-2-ethylhexanoate; tert-amyl peroxy-2-ethylhexanoate; 2,5-di(2-ethylhexanoylperoxy)-2,5-dimethylhexane; t-butyl peroxy 3,5,5-trimethylhexanoate; t-amyl peroxy 3,5,5-trimethylhexanoate; 1,1-dimethyl-3-hydroxy-butylperoxy-2-ethylhexanoate; tert-butylperoxy-3-carboxypropionate; tert-amylperoxy-3-carboxypropionate; 3-hydroxy-1,1-dimethylbutyl 2-ethyl-peroxyhexanoate; and combinations thereof.

Suitable monoperoxycarbonates may include, for example: OO-tert-butyl-O-(isopropyl) monoperoxycarbonate; OO-tert-amyl-O-(isopropyl)monoperoxycarbonate; OO-tert-butyl-O-(2-ethylhexyl)monoperoxycarbonate; OO-tert-amyl-O-(2-ethylhexyl)monoperoxycarbonate; polyether poly(OO-tert-butyl monoperoxycarbonate); OO-t-butyl-O-polycaprolactone monoperoxy carbonate; 2,5-dimethyl-2,5-bis(isopropoxycarbonyl-peroxy)hexane; 2,5-dimethyl-2,5-bis(isopropoxycarbonyl-peroxy)hexyne-3; and combinations thereof.

Suitable peroxyketals may include, for example: 1,1-di(tert-butylperoxy)-3,3,5-trimethylcyclohexane; 1-tert-amylperoxy-1-methoxy cyclohexane; 1-tert-butylperoxy-1-methoxy cyclohexane; 1,1-di(tert-butylperoxy)cyclohexane; 1,1-di(tert-amylperoxy)cyclohexane; n-butyl-4,4-di(tert-butylperoxy)valerate; 4,4-bis(tert-butylperoxy)valeric acid; ethyl-3,3-di(tert-amylperoxy)butanoate; ethyl-3,3-di(tert-butylperoxy)butanoate; ethyl-3,3-di(tert-butylperoxy)butyrate; 2,2-di(tert-butylperoxy)butane; 2,2-di(tert-amylperoxy)butane; 2,2-di(tert-butylperoxy)propane; 2,2-di(tert-amylperoxy)propane; 2,2-di(tert-butylperoxy)4-methylpentane; 2,2-bis(4,4-di[tert-amylperoxy]cyclohexyl)propane; and combinations thereof.

Suitable diacyl peroxides may include, for example: didecanoyl peroxide; dilauroyl peroxide; dibenzoyl peroxide; di(methyl benzoyl)peroxide; 2,4-dichlorobenzoyl peroxide; and combinations thereof.

Suitable ketone peroxides may include, for example: 2,4-pentanedione peroxide; methyl ethyl ketone peroxide; methyl isobutyl ketone peroxide; and mixtures thereof.

Suitable hydroperoxides may include, for example: 2,5-dihydroperoxy-2,5-dimethylhexane; cumene hydroperoxide; t-butyl hydroperoxide; t-amyl hydroperoxide; t-octyl hydroperoxide; hydrogen peroxide ($H_2O_2$); 1,1,3,3-tetramethylbutyl hydroperoxide; para-methane hydroperoxide; diisopropylbenzene monohydroperoxide; diisopropylbenzene dihydroperoxide; and combinations thereof.

Suitable peroxydicarbonates may include, for example: di(4-tert-butylcyclohexyl)peroxydicarbonate; di(cyclohexyl)peroxydicarbonate; di(2-phenoxyethyl)peroxydicarbonate; dimyristyl peroxydicarbonate; dicetyl peroxydicarbonate; and combinations thereof.

Suitable dialkyl peroxides may include, for example: dicumyl peroxide; isopropenylcumyl cumyl peroxide; isopropylcumyl cumyl peroxide; m/p-di-tert-butylperoxydiisopropylbenzene (a,a'-bis (tert-butylperoxy)diisopropylbenzene); tert-butylperoxyisopropylbenzene (tert-butyl cumyl peroxide); m-isopropylolcumyl t-butyl peroxide (tert-butyl 3-isopropylolcumylperoxide); tert-butyl-3-isopropenylcumyl peroxide (m-isopropenylcumyl tert-butyl peroxide); tert-butyl-4-isopropenylcumyl peroxide; tert-butyl-3-isopropylcumyl peroxide; m/p-acetylcumyl t-butyl peroxide; 2,4-diallyloxy-6-tert-butylperoxide-1,3,5-triazine; 3,3,5,7,7-pentamethyl-1,2,4-trioxepane (e.g., TRIGONOX® 311); 3,6,9-triethyl-3,6,9-trimethyl-1,4,7-triperoxonane (e.g., TRIGONOX® 301); di-tert-butyl peroxide; 2-methoxy-2-tert-butylperoxy propane; di-tert-amyl peroxide; 2,5-dimethyl-2,5-di(tert-butylperoxy)hexane; 2,5-dimethyl-2,5-di(tert-amylperoxy)hexane; 2,5-dimethyl-2,5-di(tert-butylperoxy)hexyne-3; 1,3-dimethyl-3(t-butylperoxy)butyl N[1{3-(1-methylethenyl)phenyl}1-methylethyl]carbamate; 4-(tert-amylperoxy)-4-methyl-2-pentanol; 4-(tert-butylperoxy)-4-methyl-2-pentanol; 3-(t-butylperoxy)-3-methyl-2-pentanone; 4-methyl-4-(tert-butylperoxy)-2-pentanone (e.g., LUPEROX® 120); 1-methoxy-1-tert-butylperoxy cyclohexane; 2,4,6-tri(tert-butylperoxy)triazine; tert-butyl-1,1,3,3-tetramethylbutyl peroxide; 3-methyl-3-(tert-butylperoxy)-2-butanol (e.g., LUPEROX® 240); 3-methyl-3(tert-amylperoxy)-2-butanol (e.g., LUPEROX® 540); and combinations thereof.

The concentration of peroxide in the aqueous treatment fluid may be selected and controlled so as to impart the desired "break" characteristics and profile for a particular downhole fracturing operation or situation. In various exemplary embodiments of the invention, the aqueous treatment fluid may be comprised of about 0.05 GPT (Gallons Per Thousand) to about 10 GPT peroxide, about 0.1 GPT to about 5 GPT peroxide, or about 0.2 GPT to about 2 GPT peroxide.

The aqueous treatment fluid includes at least one viscosifying polymer, i.e., a polymer capable of functioning as a viscosifying agent to thicken the aqueous treatment fluid. Suitable polymers generally are of high molecular weight and increase the viscosity of the aqueous treatment fluid to facilitate formation of the fractures and transport of the proppant into the fractures. Crosslinking agents or other additives may also be included to increase the viscosity of the polymer. Crosslinking agents useful for increasing the viscosity of viscosifying polymers utilized in fracturing fluids are well known in the art. In one embodiment of the invention, a viscosifying polymer is used which is a polysaccharide crosslinked with at least one crosslinker selected from the group consisting of borate, zirconium, aluminum, titanium, and chromium organometallic crosslinkers. For example, a guar or derivatized guar polymer may be crosslinked with either borates (boric acid) or zirconium compounds or both. The crosslinking agent may or may not possess time-delayed crosslinking capabilities. For example, the crosslinking agent may be a latent crosslinking agent which is only activated when exposed to certain conditions, e.g., an elevated temperature.

In an exemplary embodiment, the polymer is a water soluble and/or water swellable polymer. Water soluble and water swellable polymers are well known and may be appropriately selected by those skilled in the art.

The aqueous treatment fluids may include high viscosity gelled aqueous fluids. The polymer(s) contained in or making up the aqueous treatment fluids may include polymers, such as cross-linked functional polymers. Suitable viscosifying polymers include hydratable polysaccharides, polyacrylamides, polyacrylamide copolymers, polylactic acid, and polyvinyl alcohol. Hydratable polysaccharides may include galactomannan gums and derivatives thereof, glucomannan gums and derivatives thereof, and cellulose derivatives. Examples of such compounds are guar gum, locust beam gum, karaya gum, sodium carboxymethylguar, hydroxyethylguar, sodium carboxymethylhydroxyethylguar, hydroxypropylguar, sodium carboxymethylhydroxymethylcellulose, sodium carboxymethyl-hydroxyethylcellulose, carboxymethylguar (CMG), carboxymethylhydroxypropylguar (CMHPG), and hydroxyethylcellulose.

In one embodiment, the viscosifying polymer is selected from the group consisting of polysaccharides, polysaccharide derivatives, polyacrylates, polyacrylamides, acrylamide methyl propane sulfonic acid copolymers, polyvinyl alcohols, polylactic acids, polyvinyl pyrrolidones, maleic anhydride methyl vinyl ether copolymers, and polyethylene oxides. In an exemplary embodiment of the present invention, the polymer in the aqueous treatment fluid may include functionalized guar derivatives, guar gum, and combinations thereof.

A suitable polysaccharide, such as guar, may come in any suitable form from which it can be practically obtained. For example, guar may be obtained as a white powder (with a mesh size, for example, of 100 to 325). Water soluble polymers may also be used as thickeners. Useful polysaccharides include standard guar and derivatized or functionalized guars, such as HPG (hydroxypropylguar), hydroxybutylguar, hydroxyethylguar, CMHPG (carboxymethylhydroxy-propylguar), carboxymethylguar, carboxymethylhydroxyethylguar and combinations thereof. Derivatized polymers are particularly useful for higher temperatures as compared to standard (or non-derivatized) guar. Suitable polymers include polysaccharides which are capable of gelling in the presence of a crosslinking agent to form a gelled based fluid. Other suitable hydratable polysaccharides are the glactomannan gums, cellulose and cellulose derivatives, guar gum, locust bean gum, caraya gum, xanthan gum, starch or derivatized starch. Any suitable polymer may be used, whether water soluble or insoluble. In an exemplary embodiment, however, the viscosifying polymer is water soluble or water swellable.

Additionally, "water resistant" (yet water swelling type polymers) may be used to reduce a formation's porosity or water permeability. A variety of polymers are suitable for use as "water-resistant" polymers in embodiments of the present invention including, but not limited to: polyacrylamide, hydrolyzed polyacrylamide, xanthan, scleroglucan, polysaccharides, amphoteric polymers made from polyacrylamide, acrylic acid, and diallyldimethylammonium chloride, vinyl sulfonate/vinyl amide/acrylamide terpolymers, vinyl sulfonate/acrylamide copolymers, acrylamide/acrylamido-methylpropanesulfonic acid copolymers, acrylamide/vinylpyrrolidone copolymers, sodium carboxymethyl cellulose, poly[dialkylaminoacrylate-co-acrylate-g-poly (ethyleneoxide)]. "Water resistant" polymers are explained in more detail in U.S. Pat. No. 7,036,589, incorporated herein by reference in its entirety for all purposes.

Other suitable polymers include "microbial polysaccharides" or heteropolysaccharides, which are commonly known as Sphingans. In particular, these polymers may be useful in the preparation of energized fluids used as hydraulic aqueous treatment fluids in aqueous wellbore treatments.

Such polymers are described in U.S. Publication No. 2006/0166836 A1, herein incorporated by reference in its entirety for all purposes.

Other water-soluble polymers particularly suited for hostile environments may be useful in the recovery and processing of natural resources. For example, the water-soluble polymers may comprise N-vinyl amide, such as an N-vinyl lactam and copolymers and terpolymers of N-vinyl lactam with unsaturated amides and at least one hydrophilic vinyl-containing sulfonate, phosphonate or ester and/or hydrophilic N-vinyl lactam. Such polymers are described in U.S. Pat. No. 5,186,257, herein incorporated by reference in its entirety for all purposes.

A single viscosifying polymer may be used or a combination of viscosifying polymers may be used to form the aqueous treatment fluid. For example, the guar type (water soluble) and polyacrylamide type (water resistant) polymers may be used in combination. Any suitable ratio of polymers may be used to achieve the desired viscosity.

The concentration of viscosifying polymer in the aqueous treatment fluid may be selected and controlled so as to impart to the fluid the viscosity and other rheological characteristics desired or needed for a particular end-use application. In various embodiments of the invention, for example, the aqueous treatment fluid may comprise from about 4 PPTG (Pounds Per Thousand Gallons) to about 120 PPTG or from about 10 PPTG to about 80 PPTG viscosifying polymer (which may be a single viscosifying polymer or a combination of two or more different viscosifying polymers).

Additional additives, such as accelerators (in addition to the thiosulfate salt, sulfite salt, bisulfite salt and/or erythorbate salt) or surfactants, may be included in the aqueous treatment fluid. Surfactants may solvate or swell the viscosifying polymers. In particular, the surfactants may help to incorporate the polymer in an aqueous phase. Surfactants suitable for use in the aqueous treatment fluids include, but are not limited to, anionic, cationic, zwitterionic/amphoteric emulsifiers, and non-ionic types. For example, the surfactants described in U.S. Publication No. 2008/0217012 and/or U.S. Pat. No. 7,036,589, both of which are herein incorporated by reference in their entirety for all purposes, may be suitable. In one embodiment, the surfactant is not viscoelastic. The source of the water used to prepare the aqueous treatment fluid may be fresh water, salt water, marsh water, pond water, lake water, pond water, river water, seawater, recycled water, purified water or any other type of aqueous liquid, including those containing minerals and/or buffering agents, that would not adversely react with the various peroxide breakers described herein. Suitable accelerators for use with peroxide breakers include weak organic acids, tertiary amines, and transition metal types of organometallic compounds. Without wishing to be bound to a particular theory, it is believed that the accelerators may help to still further increase the useable temperature range for the peroxide breakers beyond what can be achieved using thiosulfate salt promoter alone. In one embodiment of the invention, no peroxide accelerator or promoter other than a thiosulfate, sulfite, bisulfite or erythorbate salt type promoter is present in the aqueous treatment fluid. In particular, the aqueous treatment fluid is essentially free of any amine accelerator or promoter.

The aqueous treatment fluid is desirably either pumpable or pourable at the hydraulic fracturing site. Any suitable equipment or techniques may be used to deliver the aqueous treatment fluid into the wellbore.

Any suitable mixing or dispersion techniques may be used to allow the components of the aqueous treatment fluid to adequately and uniformly disperse. Solvents, other than water, may also be used, but water alone is preferred due to its inert nature (e.g., it will not be harmful in end use) and abundance. In various embodiments, the aqueous treatment fluid is essentially free or free of any solvent other than water, is essentially free or free of organic solvent, or is essentially free or free of any water immiscible organic solvent. Due to the ease of dispersion in water, the peroxide may intimately associate with the polymer in the aqueous treatment fluid. For instance, the peroxide breaker may be dispersed or dissolved in water. Alternatively, the breaker may be in a pure liquid form, e.g., certain peroxides are liquid in pure form. Additionally, the breaker may be in an emulsified form.

In one embodiment, the peroxide is coated onto or absorbed into a filler material. In particular, the peroxide breaker may be coated onto the proppant itself at the appropriate use concentration or as a master batch. Similarly, in one embodiment the thiosulfate salt is coated onto or absorbed into a filler material. In particular, the thiosulfate salt may be coated onto the proppant itself at the appropriate use concentration or as a master batch. It is contemplated that any suitable filler may be used. In an exemplary embodiment, the filler used is the proppant material, such as sand, bauxite, etc. The fillers and/or the finished mixture may be a free flowing powder or may be pelletized, e.g., for easier feeding via auger systems.

Suitable particle sizes of the inert fillers may be selected by those skilled in the art. For example, the particle size distribution based upon the proppant used may be about 40/60 mesh. In an exemplary embodiment of the present invention, the particle size distribution of the inert filler used as the support for the breaker or the promoter may be about 20/40 mesh (e.g., 100% goes through 20 and 0% goes through 40 mesh).

Additionally, it is contemplated that the peroxide breaker(s) or the salt promoter(s) may be encapsulated by various means available in the art.

In one embodiment, the aqueous treatment fluid mixture comprises one or more proppants, one or more water soluble or water swellable polymers, one or more promoters selected from the group consisting of thiosulfate salts, sulfite salts, bisulfite salts and erythorbate salts, one or more peroxides, and an aqueous fluid. In another embodiment, the aqueous treatment fluid additionally comprises at least one surfactant. As the peroxide may be readily promoted by the promoter, it may be advantageous to keep these components separated until such time as the aqueous treatment fluid is to be introduced into a subterranean formation through a wellbore. For example, an aqueous treatment fluid may be formulated to be a two part system, with a first part containing the peroxide and a second part containing the promoter (e.g., thiosulfate salt). The first part and the second part are combined in the desired proportions to provide the aqueous treatment fluid. Alternatively, encapsulation techniques may be used so as to delay release of the peroxide and/or promoter until such time that promotion of the peroxide breaker by the promoter is desired. For example, the peroxide or the promoter may be encapsulated in such a manner that the component is only released into the rest of the aqueous treatment fluid and becomes available for reaction or other interaction with the other components of the aqueous treatment fluid when the mixture reaches a certain temperature after being introduced into a subterranean formation. Such encapsulation techniques may facilitate the formulation of one part aqueous treatment fluid systems, which may be more convenient to employ than two part systems.

The weight percent or parts of promoter(s) needed may depend upon the type and amount of viscosifying polymer(s) in the aqueous treatment fluid and the type and amount of peroxide breaker(s) used to degrade the polymer(s). The range of promoter relative to peroxide may be about 300,000 parts to about 0.1 parts, or about 100,000 parts to about 1 part, or about 80,000 to about 10 parts by weight of promoter(s) based on 100 parts by weight of peroxide(s) used. In one aspect of the invention, the ratio of promoter to peroxide is about 80,000 parts to about 80 parts by weight promoter to 100 parts by weight peroxide. In another aspect, the ratio of promoter to peroxide is about 20,000 parts to about 20 parts by weight promoter to 100 parts by weight peroxide. In yet another embodiment, the ratio of promoter to peroxide is about 3000 parts to about 1000 parts by weight promoter with respect to 100 parts peroxide used.

According to an embodiment of the present invention, a method of using an aqueous treatment fluid in a fracturing operation comprises introducing an aqueous treatment fluid comprising a proppant and a viscosifying polymer into a subterranean formation to form at least one fracture. The proppant is deposited in the fracture and subsequently, the viscosity of the aqueous treatment fluid is reduced with a peroxide breaker. Degradation of the polymer is accelerated and/or the temperature at which degradation of the polymer takes place is lowered by adding a thiosulfate, sulfite, bisulfite and/or erythorbate salt to the aqueous treatment fluid.

The aqueous treatment fluid may be pumped or injected into the subterranean rock formation using any suitable equipment or techniques known in the art. Typically, the high viscosity aqueous treatment fluid is injected into a wellbore under high pressure. Once the natural reservoir pressures are exceeded, the fracturing fluid initiates fracture in the formation, which generally continues to grow during pumping. It is usually preferred that the fluid reaches a maximum viscosity as it enters the fracture for optimal fracturing.

The aqueous treatment fluid may include one or more proppants. The proppants or propping agents are carried by the aqueous treatment fluid to be deposited in the cracks where they prop open the cracks created by the hydraulic fracturing. The proppant remains in the produced fractures to prevent closure of the fractures and to form a channel extending from the wellbore into the formation once the fracturing fluid is recovered. Any suitable proppant, such as sand, a synthetic ceramic proppant, or a resin/polymer coated proppant, may be used, as is well known in the art.

Once the fractures are formed and the proppants are deposited, the aqueous treatment fluid is recovered by reducing the viscosity of the fluid. As the viscosity lowers, it flows from the formation under the influence of formation fluids and pressure, but leaves the proppant in the cracks. The viscosity of the aqueous treatment fluid is reduced with one or more peroxide breakers. Unfortunately, the breakers may be difficult to control. In particular, at relatively low temperatures the peroxides may not reduce the viscosity of the aqueous treatment fluid within a suitably short period of time, if at all. Thus, recovery of the used aqueous treatment fluid from the subterranean formation may be delayed or even prevented altogether due to the continued high viscosity of the aqueous treatment fluid.

It has been discovered that by adding at least one thiosulfate, sulfite, bisulfite and/or erythorbate salt to the aqueous treatment fluid, degradation of the polymer is promoted or accelerated. This is particularly useful in hastening the degradation of the aqueous treatment fluid once a particular temperature value or range is reached. The high viscosity of the aqueous treatment fluid is maintained for a certain duration, but then "breaks" under relatively mild temperature conditions. In particular, the aqueous treatment fluids of the present invention may be formulated such that a break in the viscosity of the aqueous treatment fluid is exhibited within the temperature range of from about 100° F. to about 280° F., or from about 120° F. to about 200° F., or from about 130° F. to about 180° F., in various embodiments of the invention. Thus, one aspect of the present invention unexpectedly provides an aqueous treatment fluid system useful for the entire temperature range of from about 120° F. to about 280° F. using a single breaker, whereas at present multiple aqueous treatment fluid systems comprising multiple different breaker systems are needed in order to effectively work over this entire temperature range.

The high viscosity of the aqueous treatment fluid is maintained or protected for a certain duration or within a certain temperature range, but then is reduced through degradation of the viscosifying polymer(s) by the peroxide(s). The timing for the peroxide breaker to be effective at reducing the viscosity of the aqueous treatment fluid may depend on the duration and quantity of breaker relative to other constituents in the aqueous treatment fluid, the pH, e.g., of the aqueous treatment fluid, and/or the temperature profile. In particular, the time/pH/temperature profile of the breakers may be based on the half-life of the specific breaker and its active oxygen content. Typically, the breaker becomes more active as it approaches higher temperatures. Instead of merely adjusting the type, amount, pH, or timing of introducing the breaker, the thiosulfate, sulfite, bisulfite and/or erythorbate salt enhances the degradation of the polymer(s) by the breaker. In one embodiment, the promoters are chosen based on the temperatures when the breakers are active. The effective temperature range for the delayed breaking of viscosifying polymer-based aqueous treatment fluids may range from about 100° F. to 500° F., depending upon the type of polymer, promoter, and peroxide breaker utilized and their relative amounts and concentrations. It is well known in the art that selection of the promoter and peroxide breaker may depend on many factors. In an exemplary embodiment, the combination of promoter and peroxide is effective to achieve breaking of the aqueous treatment fluid at temperatures of about 100° F. to about 500° F. In another exemplary embodiment, the promoter/peroxide combination effectively achieves breaking of the aqueous treatment fluid at about 125° F. to about 200° F.

In another embodiment of the present invention, a method of fracturing a subterranean formation comprises providing an aqueous treatment fluid comprising a proppant, a viscosifying polymer, and a peroxide breaker and adding one or more promoters selected from the group consisting of thiosulfate salts, sulfite salts, bisulfite salts and erythorbate salts to the aqueous treatment fluid. The aqueous treatment fluid is supplied to a desired location in a subterranean formation and the aqueous treatment fluid is maintained with sufficient viscosity to form at least one fracture. The breaker is allowed to degrade the polymer and reduce the viscosity of the aqueous treatment fluid at a specific time or temperature, the breaker's activity being enhanced or promoted by the promoter which is present.

Thus, aspects of the present invention include aqueous treatment fluids, methods for using the aqueous treatment fluids, and methods for forming subterranean formations. By adding at least one promoter such as a thiosulfate salt to the aqueous treatment fluid, degradation of the polymer in the aqueous treatment fluid may be initiated once a specific desired time or temperature is reached, wherein such time is shorter or such temperature is lower than is observed in the absence of the promoter. Consequently, the aqueous treatment fluid is able to appropriately fracture the formation under certain pressure and temperature conditions and then exhibit a reduction in viscosity effective to allow the aqueous treatment fluid to be withdrawn from a subterreanean formation.

Example 1

An aqueous treatment fluid (aqueous treatment fluid formulation) was prepared using 500 mL water, 10 GPT (Gallons Per Thousand) guar viscosifying polymer slurry, 1.5 GPT 25% NaOH in water, 3 GPT delayed borate crosslinker and 0.2 GPT Luperox® TBH70X 70% t-butyl hydroperoxide in water to serve as the breaker.

The aqueous treatment fluid formulation was prepared and evaluated in accordance with the following procedure: The water is added to a wide mouth glass jar with overhead mixer at 730 rpm. The guar viscosifying polymer slurry is added via a 5 mL syringe and allowed to stir for 10 minutes. The NaOH solution is added to bring the pH to 11.5. The delayed borate crosslinker is then added, followed by the t-butyl hydroperoxide, and allowed to mix for 1 minute. After the aqueous treatment fluid formulation is prepared, 52 mL is transferred to a Grace M5600 rheometer sample cup via a syringe. This sample is run at 40/sec. shear rate at 140° F. and 400 psi pressure for 3 hours as a control.

The Grace M5600 Rheometer unit is equipped with an API 39 standard size rotor and bob, designated "R1B5", or rotor 1, bob 5. The B5 bob is commonly used for fracturing fluid testing. This Grace Rheometer instrument and B5 bob was used in each of the following examples. A fixed shear rate of 40/seconds, at 170 F and 400 psi with a standard B5 bob was used.

In accordance with the present invention, another sample is prepared following the same procedure, except that 6 GPT (Gallons Per Thousand) sodium thiosulfate (30% concentration in water) is added following the addition of the NaOH solution.

Results

Referring to FIG. 1, the control aqueous treatment fluid formulation using 0.2 GPT of 70% t-butylhydroperoxide with no sodium thiosulfate added did not exhibit a break at 140° F. When, however 6.0 GPT of the 30% sodium thiosulfate solution is added to the formulation following the addition of the 25% NaOH solution, a break in the viscosity of the fracture fluid composition is unexpectedly observed at the lower temperature of 140° F. Thus, the addition of sodium thiosulfate to the aqueous treatment fluid composition helps to promote the effect of t-butyl hydroperoxide as a breaker, permitting achievement of a break in the aqueous treatment fluid composition at a relatively low temperature. This was unexpected as sodium thiosulfate is ordinarily used to stabilize (i.e., prevent breaking) of the guar gel at elevated temperatures to protect guar from losing viscosity. This example shows that the activators used in the practice of this invention enable an efficient break of the guar fluid viscosity at low temperatures, not possible when using t-butylhydroperoxide (tBHP) alone.

Example 2

An aqueous treatment fluid (aqueous treatment fluid formulation) was prepared using 500 mL water, 10 GPT (Gallons Per Thousand) guar viscosifying polymer slurry, 1.5 GPT 25% NaOH in water, 3 GPT delayed borate crosslinker and 5.0 GPT of 5% t-butyl hydroperoxide.

The aqueous treatment fluid formulation was prepared and evaluated in accordance with the following procedure: The water is added to a wide mouth glass jar with overhead mixer at 730 rpm. The guar viscosifying polymer slurry is added via a 5 mL syringe and allowed to stir for 10 minutes. The NaOH solution is added to bring the pH to 11.5. The delayed borate crosslinker is then added, followed by the t-butyl hydroperoxide, and allowed to mix for 1 minute. After the aqueous treatment fluid formulation is prepared, 52 mL is transferred to a Grace 5600 sample cup via a syringe. This sample is run at 40/sec. shear rate at 200° F. and 400 psi pressure for 3 hours as a control. Note: at this temperature of 200 F, we expect to see as break when using 5.0 GPT 5% concentration of t-butyl hydroperoxide in water.

In accordance with the present invention, another sample is prepared following the same procedure, except that 0.5 GPT (Gallons Per Thousand) sodium thiosulfate (35% concentration in water) is added following the addition of the NaOH solution, and only 1 GPT of 5% t-butyl hydroperoxide.

Results

Figure 2:
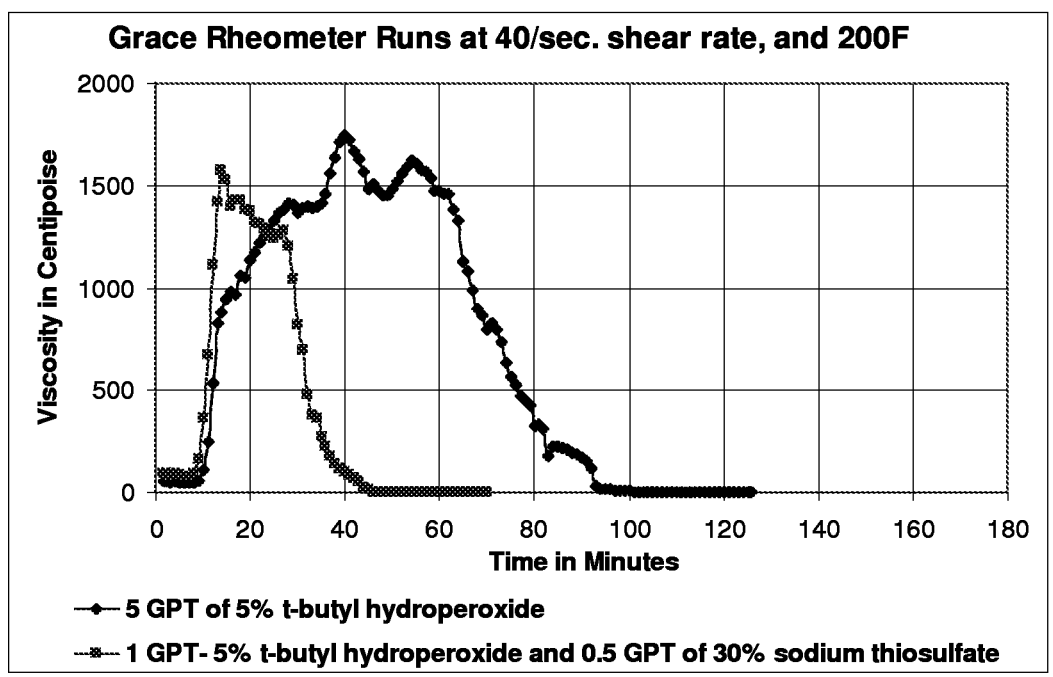
FIG. 2 pertains to Example 2.

Referring to FIG. 2, the use of 0.5 GPT of 30% sodium thiosulfate provides a very efficient break at 42 minutes when using only 1 GPT of 5% t-butyl hydroperoxide at 200 F. The use of the sodium thiosulfate gave a complete break in less than half the time versus no sodium thiosulfate and less peroxide breaker. In other words, to achieve the slower 90 minute break at 200F, it required five times the amount of breaker, i.e., 5 GPT of 5% t-butyl hydroperoxide with no sodium thiosulfate versus only 1 GPT of 5% t-butyl hydroperoxide with 0.5 GPT of 30% sodium thiosulfate.

Thus, the compositions and methods of this invention provide a novel and unexpected result: to quickly and effectively break a guar fracture fluid while allowing the use of less peroxide breaker versus the singular use of 5% t-butyl hydroperoxide. Thus, this novel system allows for less material at the job site, less energy costs associated with transportation of those materials, and less issues in regard to overall environmental impact.

Example 3

An aqueous treatment fluid (aqueous treatment fluid formulation) was prepared using 500 mL water, 10 GPT (Gallons Per Thousand) guar viscosifying polymer slurry, 1.5 GPT 25% NaOH in water, 3 GPT delayed borate crosslinker and 1.0 GPT of 5% t-butyl hydroperoxide.

The aqueous treatment fluid formulation was prepared and evaluated in accordance with the following procedure: The water is added to a wide mouth glass jar with overhead mixer at 730 rpm. The guar viscosifying polymer slurry is added via a 5 mL syringe and allowed to stir for 10 minutes. The NaOH solution is added to bring the pH to 11.5. The delayed borate crosslinker is then added, followed by the t-butyl hydroperoxide, and allowed to mix for 1 minute. After the aqueous treatment fluid formulation is prepared, 52 mL is transferred to a Grace 5600 sample cup via a syringe.

This sample is run at 40/sec. shear rate at 170° F. and 400 psi pressure for 3 hours as a control.

In accordance with the present invention, another sample is prepared following the same procedure, except that 0.5 GPT (Gallons Per Thousand) of a 10% aqueous solution of sodium sulfite, is added following the addition of the NaOH solution.

Results

Figure 3:
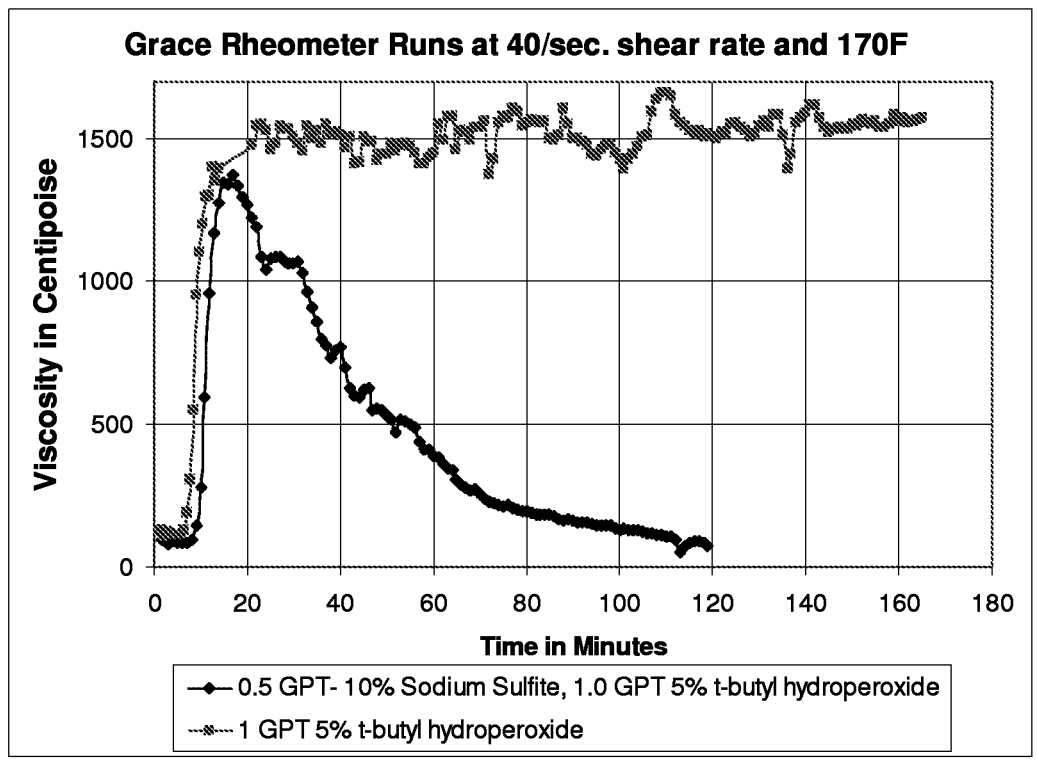
FIG. 3 pertains to Example 3.

Referring to FIG. 3, no break in viscosity was achieved using 1 GPT of a 5% aqueous solution of t-butylhydroperoxide at 170 F. However, a significant break was achieved in two hours when using the same breaker and loading while adding 0.5 GPT of a 10% aqueous solution of sodium sulfite, again at the temperature of 170 F.

There also was a delay in the formation of viscosity build when using the sodium sulfite in addition to the fast break time. The delay in viscosity build is beneficial to improve pumping fluids downhole.

Example 4

An aqueous treatment fluid (aqueous treatment fluid formulation) was prepared using 500 mL water, 10 GPT (Gallons Per Thousand) guar viscosifying polymer slurry, 1.5 GPT 25% NaOH in water, 3 GPT delayed borate crosslinker and 5.0 GPT of 5% t-butyl hydroperoxide.

The aqueous treatment fluid formulation was prepared and evaluated in accordance with the following procedure: The water is added to a wide mouth glass jar with overhead mixer at 730 rpm. The guar viscosifying polymer slurry is added via a 5 mL syringe and allowed to stir for 10 minutes. The NaOH solution is added to bring the pH to 11.5. The delayed borate crosslinker is then added, followed by the t-butyl hydroperoxide, and allowed to mix for 1 minute. After the aqueous treatment fluid formulation is prepared, 52 mL is transferred to a Grace 5600 sample cup via a syringe. This sample is run at 40/sec. shear rate at 170° F. and 400 psi pressure for 3 hours as a control.

Figure 4:
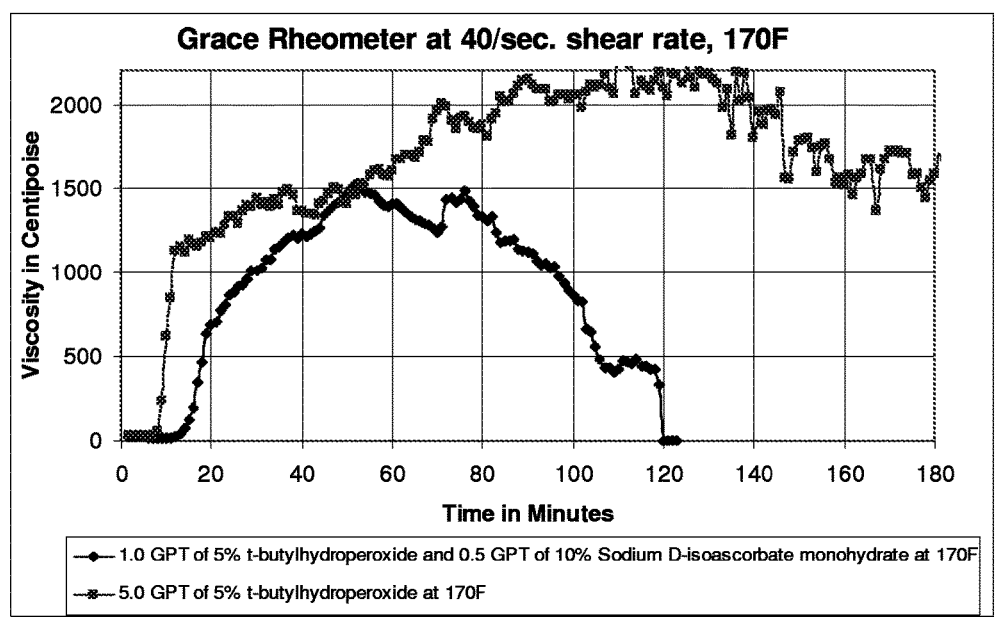
FIG. 4 pertains to Example 4.

Referring to FIG. 4, no break in guar polymer viscosity at 170 F was observed when using an elevated use of 5.0 GPT 5% t-butyl hydroperoxide in water and no activator.

In accordance with the present invention, another sample is prepared following the same procedure, except that 1.0 GPT of 5% concentration of t-butyl hydroperoxide in water (five times less than the control sample) plus the use of 0.5 GPT (Gallons Per Thousand) of 10% Sodium D-isoascorbate monohydrate which was added following the addition of the NaOH solution.

Results

Referring to FIG. 4 for this Example 4, at 170 F no significant break (reduction) in polymer fracture fluid viscosity was observed when using a large amount of a peroxide breaker, i.e., 5.0 GPT of a 5% t-butyl hydroperoxide without promoter. However, as show in FIG. 4, the use of 1.0 GPT of 5% t-butyl hydroperoxide as a breaker combined with 0.5 GPT of 10% sodium D-isoascorbate monohydrate resulted in a significant break in fracture fluid viscosity at 170 F in about two hours. Along with the increased efficiency for the reduction in fluid viscosity, this novel system also provided a desirable delay in viscosity build at the early part of the preparation of the fluid. This is desirable because it allows for easier processing of the fluid in the early stages of the fracture fluid operation. The viscosity build began and then after two hours broke, which is required in well operations for the removal of polymeric fluid from the sand filled expanded rock crevices. A complete break of the fracture fluid is important for good conductivity of gas and/or oil from the expanded rock crevices to the well bore.

Example 5

An aqueous treatment fluid (aqueous treatment fluid formulation) was prepared using 500 mL water, 10 GPT (Gallons Per Thousand) guar viscosifying polymer slurry, 1.5 GPT 25% NaOH in water, 3 GPT delayed borate crosslinker and 5.0 GPT of 5% t-butyl hydroperoxide.

The aqueous treatment fluid formulation was prepared and evaluated in accordance with the following procedure: water is added to a wide mouth glass jar with overhead mixer at 730 rpm. The guar viscosifying polymer slurry is added via a 5 mL syringe and allowed to stir for 10 minutes. The NaOH solution is added to bring the pH to 11.5. The delayed borate crosslinker is then added, followed by the t-butyl hydroperoxide, and allowed to mix for 1 minute. After the aqueous treatment fluid formulation is prepared, 52 mL is transferred to a Grace 5600 sample cup via a syringe. This sample is run at 40/sec. shear rate at 170° F. and 400 psi pressure for 3 hours as a control.

Figure 5:
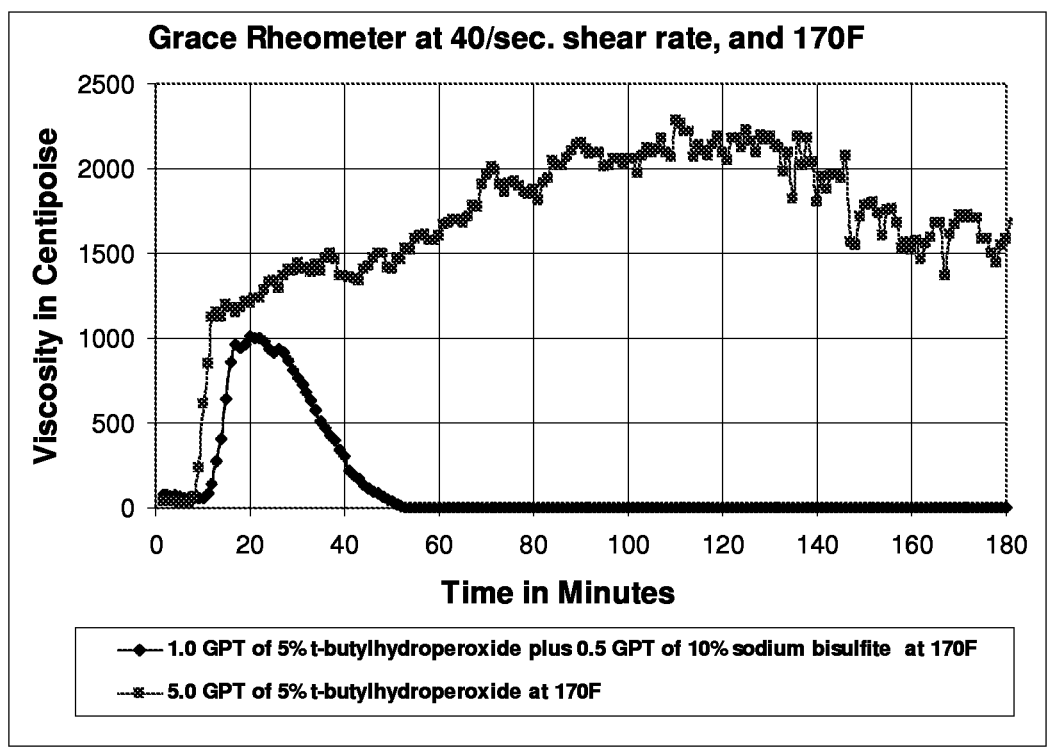
FIG. 5 pertains to Example 5. A complete break in fluid viscosity was achieved at 170 F using a solution of 0.5 GPT of 10% sodium bisulfite with 1.0 GPT of 5% tert-butyl hydroperoxide. The fracture fluid system was a polysaccharide delayed borate crosslinked fracture fluid.

Referring to FIG. 5, no break in guar polymer viscosity at 170 F was observed even when using an elevated use of 5.0 GPT 5% t-butyl hydroperoxide with no activator.

In accordance with the present invention, another sample is prepared following the same procedure, except that 1.0 GPT of 5% concentration of t-butyl hydroperoxide in water (five times less than the control sample) plus the use of 1.0 GPT of 10% sodium bisulfite which was added following the addition of the NaOH solution.

Results

Referring to FIG. 5, at 170 F no significant break (reduction) in polymer fracture fluid viscosity was observed when using 5.0 GPT of a 5% t-butyl hydroperoxide without promoter. However, again referring to FIG. 5, it was unexpectedly found that the use of only 1.0 GPT of 5% t-butyl hydroperoxide as a breaker, combined with only 1.0 GPT of 10% sodium bisulfite resulted in a significant break in fracture fluid viscosity at 170 F in about 50 minutes. Along with this increased efficiency for the reduction in fluid viscosity, the novel formulations of this invention also provided a desirable delay in viscosity build at the early part of the preparation of the fluid. This is desirable as it allows for much easier processing of the fluid in the early stages of the fracture fluid operation.

What is claimed is:

1. An aqueous treatment fluid consisting essentially of:
   (a) a mixture or dispersion of water,
   (b) viscosifying polymer which is water-soluble or water swellable polymer selected from the group consisting of:
      (i) polysaccharides crosslinked with at least one crosslinker selected from the group consisting of borate, zirconium, aluminum, titanium, and chromium organometallic crosslinkers,
      (ii) polysaccharides selected from the group consisting of guar gum, HPG (hydroxypropylguar), CMG (carboxymethylguar), CMHPG (carboxymethylhydroxypropylguar), and combinations thereof, and
      (iii) underivatized guar, starches, cellulose, derivatized guars, polyacrylamides, polyacrylates, functionalized polyacrylamide polymers, acrylamide methyl propane sulfonic acid copolymers, polyvinyl alcohol, polyvinyl pyrrolidones, maleic anhydride methyl vinyl ether copolymers, polyethylene oxides and combinations thereof,
- (c) at least one peroxide breaker selected from the group consisting of 2,5-dihydroperoxy-2,5-dimethylhexane; cumene hydroperoxide; t-butyl hydroperoxide; t-amyl hydroperoxide; t-octyl hydroperoxide; 1,1,3,3-tetramethylbutyl hydroperoxide; para-menthane hydroperoxide; diisopropylbenzene monohydroperoxide; diisopropylbenzene dihydroperoxide; 2,4-pentanedione peroxide; methyl ethyl ketone peroxide, methyl isobutyl ketone peroxide and combinations thereof,
- (d) at least one promoter selected from the group consisting of thiosulfate salts, sulfite salts, bisulfite salts, erythorbate salts, isoascorbate salts, and combinations thereof, and optionally:
- (e) at least one buffering agent or buffer system,
  - (f) at least one proppant, and/or
  - (g) one or more additives selected from the group consisting of surfactants and inert fillers,
  wherein the aqueous treatment fluid is essentially free of added amine.

2. The aqueous treatment fluid of claim 1, wherein the water is selected from the group consisting of fresh water, recycled water, salt water, marsh water, pond water, river water, lake water and combinations thereof.

3. The aqueous treatment fluid of claim 1, wherein the at least one promoter is selected from the group consisting of sodium thiosulfate, potassium thiosulfate, ammonium thiosulfate, silver thiosulfate, iron thiosulfate, copper thiosulfate, cobalt thiosulfate, calcium thiosulfate, manganese thiosulfate, vanadium thiosulfate, and combinations thereof.

4. The aqueous treatment fluid of claim 1, wherein the at least one viscosifying polymer is a crosslinked polysaccharide.

5. The aqueous treatment fluid of claim 1, wherein the at least one viscosifying polymer is a polysaccharide crosslinked with at least one crosslinker selected from the group consisting of borate, zirconium, aluminum, titanium, and chromium organometallic crosslinkers.

6. The aqueous treatment fluid of claim 1, wherein the at least one viscosifying polymer is a polysaccharide selected from the group consisting of guar gum, HPG (hydroxypropylguar), CMG (carboxymethylguar), CMHPG (carboxymethylhydroxypropylguar), and combinations thereof.

7. The aqueous treatment fluid of claim 1, comprising about 4 to 120 pptg (pounds per thousand gallons) of peroxide and about 0.001% to 10% of promoter.

8. The aqueous treatment fluid of claim 1, wherein the at least one proppant is selected from the group consisting of sand proppants, synthetic ceramic proppants, resin/polymer-coated proppants, and combinations thereof.

9. The aqueous treatment fluid of claim 1, wherein the at least one peroxide has a water solubility greater than 1 g/100 g water at 25° C.

10. The aqueous treatment fluid of claim 1, wherein the aqueous treatment fluid is essentially free of water immiscible organic solvent.

11. A method comprising introducing an aqueous treatment fluid into at least a portion of a subterranean formation, wherein the aqueous treatment fluid consists essentially of:
viscosifying polymer which is water-soluble or water swellable polymer selected from the group consisting of:
- (i) polysaccharides crosslinked with at least one crosslinker selected from the group consisting of borate, zirconium, aluminum, titanium, and chromium organometallic crosslinkers,
- (ii) polysaccharides selected from the group consisting of guar gum, HPG (hydroxypropylguar), CMG (carboxymethylguar), CMHPG (carboxymethylhydroxypropylguar), and combinations thereof, and
- (iii) underivatized guar, starches, cellulose, derivatized guars, polyacrylamides, polyacrylates, functionalized polyacrylamide polymers, acrylamide methyl propane sulfonic acid copolymers, polyvinyl alcohol, polyvinyl pyrrolidones, maleic anhydride methyl vinyl ether copolymers, polyethylene oxides and combinations thereof, at least one peroxide breaker selected from the group consisting of 2,5-dihydroperoxy-2,5-dimethylhexane; cumene hydroperoxide; t-butyl hydroperoxide; t-amyl hydroperoxide; t-octyl hydroperoxide; 1,1,3,3-tetramethylbutyl hydroperoxide; para-menthane hydroperoxide; diisopropylbenzene monohydroperoxide; diisopropylbenzene dihydroperoxide; 2,4-pentanedione peroxide; methyl ethyl ketone peroxide, methyl isobutyl ketone peroxide and combinations thereof, and an amount of at least one promoter selected from the group consisting of thiosulfate salts, sulfite salts, bisulfite salts, erythorbate, salts, isoascorbate salts and combinations thereof which is effective to decrease the break temperature of the aqueous treatment fluid, wherein the aqueous treatment fluid is essentially free of added amine.

12. The method of claim 11, wherein the aqueous treatment fluid is introduced into the subterranean formation through a wellbore.

13. The method of claim 11, wherein the at least one viscosifying polymer includes a polysaccharide.

14. The method of claim 13, wherein the polysaccharide is crosslinked.

15. The method of claim 13, wherein the polysaccharide is a guar gum.

16. The method of claim 11, wherein the aqueous treatment fluid is additionally comprised of at least one crosslinking agent.

17. The method of claim 11, wherein the aqueous treatment fluid comprises about 4 to 120 pptg (pounds per thousand gallons) of peroxide and about 0.001% to 10% of promoter.

18. The method of claim 11, wherein the aqueous treatment fluid is additionally comprised of a buffer system.

19. The method of claim 11, wherein the amount of promoter is effective to lower the break temperature of the aqueous treatment fluid by at least 5° F. as compared to the break temperature obtained for the aqueous treatment fluid in the absence of the at least one promoter.

* * * * *